(12) United States Patent
Kim et al.

(10) Patent No.: US 10,438,042 B2
(45) Date of Patent: Oct. 8, 2019

(54) OPTICAL FINGERPRINT RECOGNITION SENSOR

(71) Applicant: SILICON DISPLAY TECHNOLOGY, Yongin (KR)

(72) Inventors: Jaemin Kim, Gyeongsan (KR); Kijoong Kim, Suwon (KR); Ow Tae Kwon, Andong (KR); Ji Ho Hur, Yongin (KR)

(73) Assignee: SILICON DISPLAY TECHNOLOGY, Yongin-si (KR)

( * ) Notice: Subject to any disclaimer, the term of this patent is extended or adjusted under 35 U.S.C. 154(b) by 23 days.

(21) Appl. No.: 15/422,579

(22) Filed: Feb. 2, 2017

(65) Prior Publication Data

US 2017/0228576 A1    Aug. 10, 2017

(30) Foreign Application Priority Data

Feb. 5, 2016   (KR) .................. 10-2016-0015250

(51) Int. Cl.
*G06F 9/00* (2006.01)
*G06K 9/00* (2006.01)

(52) U.S. Cl.
CPC ....... *G06K 9/0004* (2013.01); *G06K 9/00053* (2013.01); *G06K 9/00087* (2013.01)

(58) Field of Classification Search
CPC ............ H01L 27/124; H01L 29/7869; H01L 21/02554; H01L 27/14643; G06K 9/0004; G06K 9/00053; G06K 9/00013; G06F 21/32; G02F 1/13318; A61B 5/1172; G09G 2360/142
See application file for complete search history.

(56) References Cited

U.S. PATENT DOCUMENTS

| | | | |
|---|---|---|---|
| 2004/0211960 A1* | 10/2004 | Joo ...................... | H01L 27/1214 257/59 |
| 2004/0252867 A1* | 12/2004 | Lan ...................... | G06K 9/0004 382/124 |
| 2011/0084270 A1* | 4/2011 | Yamazaki ........... | H01L 29/7869 257/43 |
| 2012/0223349 A1* | 9/2012 | Lee ...................... | H01L 51/5234 257/98 |
| 2017/0162807 A1* | 6/2017 | Moriwaki ............. | H01L 27/146 |

FOREIGN PATENT DOCUMENTS

| | | | |
|---|---|---|---|
| KR | 20030081260 A | * | 10/2003 |
| KR | 10-2015-0131944 | | 11/2015 |
| WO | 2016/009693 | | 1/2016 |

* cited by examiner

*Primary Examiner* — Kim Y Vu
*Assistant Examiner* — Michael J Vanchy, Jr.
(74) *Attorney, Agent, or Firm* — Lex IP Meister, PLLC

(57) ABSTRACT

An optical fingerprint recognition sensor may improve internal light utilization efficiency and includes: a glass substrate; a protection layer that is positioned on the glass substrate; an active layer that is positioned above the glass substrate and in the protection layer; and a functional layer that is positioned in the protection layer and on the active layer and that includes a first transparent oxide layer and a first metal layer that are sequentially stacked.

18 Claims, 11 Drawing Sheets

OPTICAL FINGERPRINT RECOGNITION SENSOR

CROSS-REFERENCE TO RELATED APPLICATION

This application claims priority to and the benefit of Korean Patent Application No. 10-2016-0015250 filed in the Korean Intellectual Property Office on Feb. 5, 2016, the entire contents of which are incorporated herein by reference.

BACKGROUND OF THE INVENTION (a) Field of the Invention

An optical fingerprint recognition sensor is provided.

(b) Description of the Related Art

Recently, a capacitive fingerprint sensor and an optical fingerprint sensor have been widely used. In general, the capacitive fingerprint sensor recognizes a fingerprint by sensing static electricity caused by the fingerprint of a human body using a semiconductor element that is sensitive to a voltage and a current. On the contrary, the optical fingerprint sensor has excellent durability, and is formed with a structure that includes a light source and an optical sensor and thus the optical fingerprint sensor senses a user's fingerprint when the optical sensor senses light emitted from the light source.

A conventional optical fingerprint sensor may not be able to acquire a clear image of a fingerprint due to incident external light such as sunlight.

In addition, when the fingerprint and a surface of the sensor are too far from each other, light reflected from an adjacent fingerprint can be easily incident thereon, and thus when the distance between the fingerprint and the surface of the sensor is 10 um or more, light reflected from fingerprints are mixed so that a clear fingerprint image cannot be acquired.

Further, light utilization efficiency (energy utilization efficiency) of the backlight used for sensor recognition is low, thereby deteriorating productivity.

The above information disclosed in this Background section is only for enhancement of understanding of the background of the invention and therefore it may contain information that does not form the prior art that is already known in this country to a person of ordinary skill in the art.

SUMMARY OF THE INVENTION

An exemplary embodiment of the the present invention has been made in an effort to provide an optical fingerprint sensor that can improve internal light utilization efficiency.

An exemplary embodiment of the present invention has been made in an effort to provide an optical fingerprint sensor having enhanced accuracy.

The present invention can be used to achieve other efforts which are not described in detail in addition to the above efforts.

An optical fingerprint recognition sensor according to an exemplary embodiment of the present invention includes: a glass substrate; a protection layer that is positioned on the glass substrate; an active layer that is positioned above the glass substrate and in the protection layer; and a functional layer that is positioned in the protection layer and on the active layer and that includes a first transparent oxide layer and a first metal layer that are sequentially stacked.

The optical fingerprint recognition sensor may further include a second metal layer that is positioned between the active layer and the functional layer.

The optical fingerprint recognition sensor may further include a second transparent oxide layer that is positioned between the active layer and the second metal layer.

The second transparent oxide layer and the second metal layer may be sequentially stacked.

The second transparent oxide layer and the second metal layer may be spaced apart from each other.

The second metal layer may be provided under the functional layer and the second transparent oxide layer may be positioned on the active layer. Here, the photosensor includes a second metal layer and a functional layer.

The protection layer may include an interior protection layer that is positioned on the glass substrate and an exterior protection layer that is positioned on the interior protection layer, the active layer and the second transparent oxide layer are positioned in the interior protection layer, and the functional layer and the second metal layer are positioned in the exterior protection layer.

The first metal layer and the second metal layer may include the same material.

The first metal layer and the second metal layer may include Ag or Al.

The first transparent oxide layer and the second transparent oxide layer may include a metal oxide.

The first transparent oxide layer and the second transparent oxide layer may include indium zinc oxide (IZO) or $SiO_2$.

The first transparent oxide layer may include indium zinc oxide (IZO), and a thickness of the first transparent oxide layer may be 20 nm to 150 nm.

The first transparent oxide layer may include $SiO_2$, and a thickness of the first transparent oxide layer is 50 nm to 200 nm.

The first metal layer and the second metal layer may include Ag, and the first metal layer and the second metal layer may have a thickness of 20 nm to 40 nm.

The first transparent oxide layer may include indium zinc oxide (IZO), a thickness of the first transparent oxide layer is 20 nm to 150 nm, the first metal layer and the second metal layer may include Al, and the first metal layer and the second metal layer may have a thickness of 8 nm to 12 nm.

The optical fingerprint recognition sensor may further include a thin film transistor that is positioned in the protection layer, wherein the active layer may be provided on an electrode that extends from a drain electrode of the thin film transistor.

The thin film transistor may have a co-planar structure, a staggered structure, an inverted co-planar structure, or an inverted staggered structure.

The optical fingerprint recognition sensor may further include a liquid crystal display (LCD) backlight that is positioned below the optical fingerprint sensor.

The optical fingerprint sensor according to an exemplary embodiment of the present invention can improve light utilization efficiency of a backlight and enhance fingerprint recognition accuracy.

DETAILED DESCRIPTION OF THE EMBODIMENTS

Figure 1:
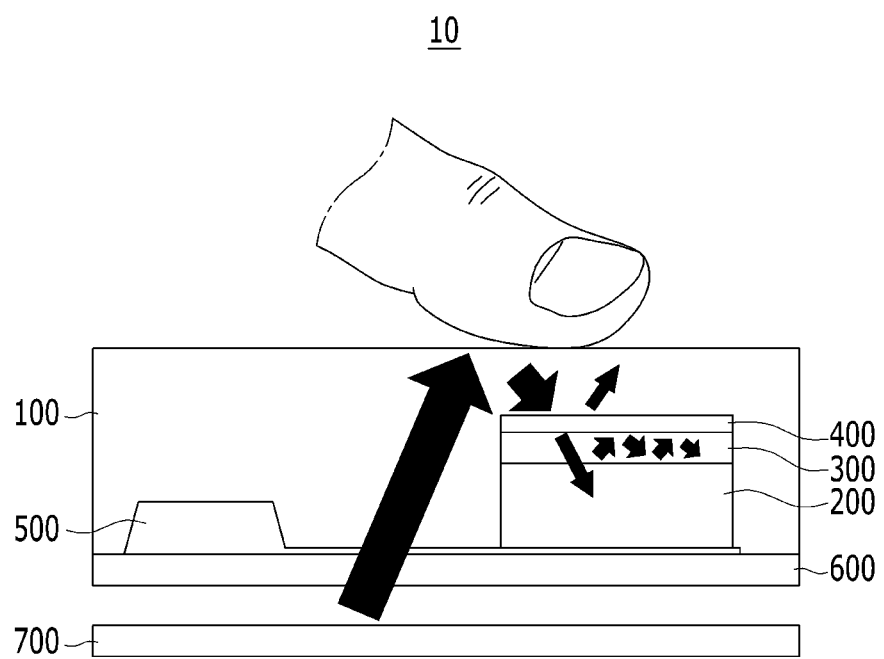
FIG. 1 is a cross-sectional view of an optical fingerprint sensor according to an exemplary embodiment of the present invention.

The present invention will be described more fully hereinafter with reference to the accompanying drawings, in which exemplary embodiments of the invention are shown.

As those skilled in the art would realize, the described embodiments may be modified in various different ways, all without departing from the spirit or scope of the present invention. In describing the present invention, parts that are not related to the description will be omitted in the drawings. Like reference numerals generally designate like elements throughout the specification. In addition, the detailed description of the widely known technologies will be omitted.

In addition, unless explicitly described to the contrary, the word "comprise" and variations such as "comprises" or "comprising" will be understood to imply the inclusion of stated elements but not the exclusion of any other elements.

Referring to FIG. 1, an optical fingerprint sensor 10 according to an exemplary embodiment of the present invention may include a protection layer 100 and a functional layer that is provided in the protection layer 100. The functional layer includes an active layer 200, a first transparent oxide layer 300, and a first metal layer 400. The active layer 200 may be connected with a drain electrode of a thin film transistor 500, and a glass substrate 600 may be provided under the protection layer 100. In addition, a backlight 700, which is a light source supplying light, is provided below the glass substrate 600. The functional layer that includes the active layer 200, the first transparent oxide layer 300, and the first metal layer 400 serves as a photosensor.

The protection layer 100 according to the exemplary embodiment of the present invention may include glass, quartz, plastic, and the like, and any known material having excellent properties such as durability, scratch resistance, and the like may be applicable.

The active layer 200 according to the exemplary embodiment of the present invention is a sensor layer that senses light reflected from a fingerprint, and may include a semiconductor material. For example, the active layer 200 may be one of a low temperature polysilicon semiconductor, an amorphous silicon semiconductor, and an oxide semiconductor.

The first transparent oxide layer 300 according to the exemplary embodiment of the present invention may include various oxides, and for example, indium zinc oxide (IZO) or $SiO_2$.

The first metal layer 400 according to the exemplary embodiment of the present invention may include various metal layers, and for example, may include silver (Ag) or aluminum (Al).

The first transparent oxide layer 300 and the first metal layer 400 become basic elements that form the functional layer of the exemplary embodiment of the present invention. The functional layer allows light of a certain wavelength range to be incident on the active layer 200, and enhances light utilization efficiency by minimizing a light loss due to reflection of incident light.

Selective incidence of light in the functional layer that includes the first transparent oxide layer 300 and the first metal layer 400 according to the exemplary embodiment of the present invention can be realized by adjusting a refractive index and a thickness of the first transparent oxide layer 300 and the first metal layer 400. For example, the first transparent oxide layer 300 may include a material that has a lower refractive index than the first metal layer 400. In addition, a refractive index of the first transparent oxide layer 300 may be higher than a refractive index of the active layer 200.

When the refractive index and the thickness are adjusted, light generated from the backlight 700 is reflected from a finger that contacts the protection layer 100 along a light path indicated by the arrows in FIG. 1. Light of a certain wavelength among the reflective light is transmitted through the first metal layer 400 and is then incident on the first transparent oxide layer 300, and a part of the light incident on the first transparent oxide layer 300 reaches the active layer 200 due to a relationship between the first metal layer 400 and the first transparent oxide layer 300. Light reflected from the active layer 200 may be reflected multiple times due to the relationship between the first metal layer 400 and the first transparent oxide layer 300, and an amount of light for recognition of a fingerprint in the active layer 200 can be increased by such multiple reflection. Transmittance and reflectance of light of a specific wavelength will be described together with data later.

Figure 2:
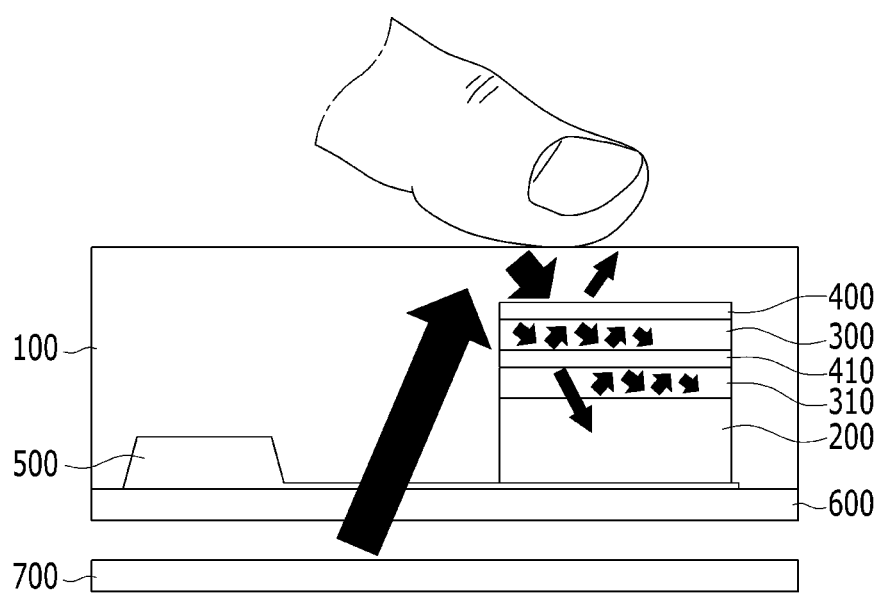
FIG. 2 and FIG. 3 are cross-sectional views of an optical fingerprint sensor according to another exemplary embodiment of the present invention.

FIG. 2 is another exemplary embodiment of the present invention, and in the present exemplary embodiment, a second metal layer 410 and a second transparent oxide layer 310 may be provided between a first transparent oxide layer 300 and an active layer 200, which are constituent elements of the exemplary embodiment shown in FIG. 1. The present exemplary embodiment has a structure that can more enhance utilization efficiency of light of a specific wavelength compared to the exemplary embodiment of FIG. 1, and the second metal layer 410 and the second transparent oxide layer 310 may serve as additional functional layers. Light of a specific wavelength transmitted through the first metal layer 400 and the first transparent oxide layer 300 is reflected multiple times again in the second metal layer 410 and the second transparent oxide layer 310 such that utilization efficiency of light of a specific wavelength can be more enhanced. Here, the active layer 200, the functional layer, the second metal layer 410, and the second transparent oxide layer 310 may serve as a photosensor.

Figure 3:
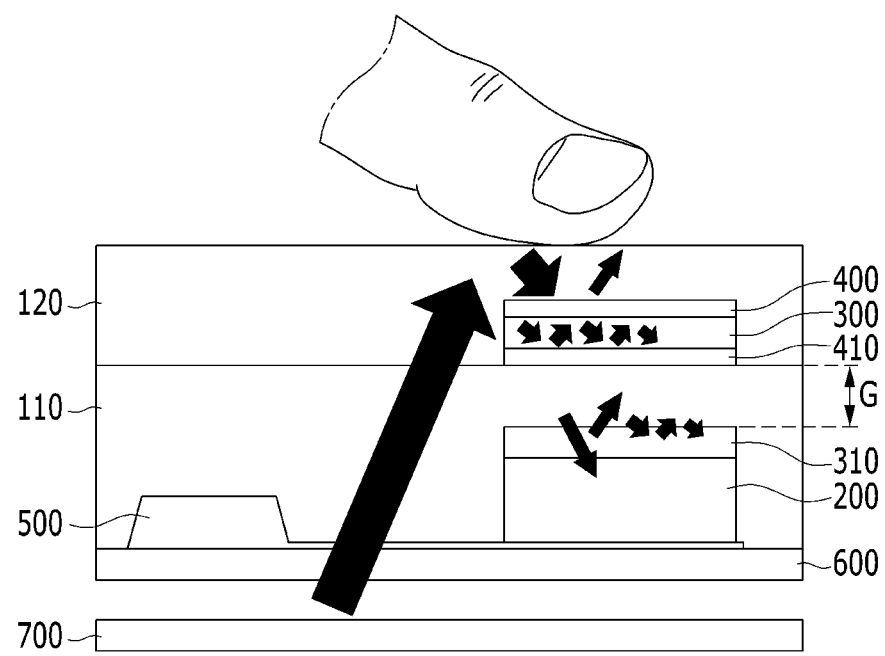

FIG. 3 shows another exemplary embodiment of the present invention, and in the present exemplary embodiment, a second transparent oxide layer 310 and a second metal layer 410 may be spaced apart from each other by a distance G. In this case, the second transparent oxide layer 310 may be included in an interior protection layer 110 that is stacked on a glass substrate 600, and a functional layer that includes the second metal layer 310, a first metal layer 400, and a first transparent oxide layer 300 may be included in the exterior protection layer 120. The interior protection layer 110 and the exterior protection layer 120 may include the same material. Since the interior protection layer 110 and the exterior protection layer 120 are respectively provided, the distance G can be easily formed. Here, the second transparent oxide layer 310 can be omitted. A movement path of light of a specific wavelength is the same as in the exemplary embodiment shown in FIG. 2. The active layer 200, the functional layer, the second transparent oxide layer 310, and the distance G between the second transparent oxide layer 310 and the second metal layer 410 may serve as a photosensor.

The first metal layers 400 and the second metal layers 410 of the above-stated exemplary embodiments may include various metals, and may include, for example, silver (Ag) or aluminum (Al). In this case, the first metal layer 400 and the second metal layer 410 may include the same material, and may have a thin film shape.

The first transparent oxide layer 300 and the second transparent oxide layer 310 according to the exemplary embodiments may include various metal oxides. For example, the transparent oxide layers 300 and the second transparent oxide layers 310 may respectively include indium zinc oxide (IZO) or $SiO_2$. Alternatively, the first transparent oxide layers 300 and the second transparent oxide layers 310 according to the exemplary embodiments may include the same material, or may include different materials.

Hereinafter, test results of the above-described exemplary embodiments will be described with reference to FIG. 4 to FIG. 11.

Figure 4:
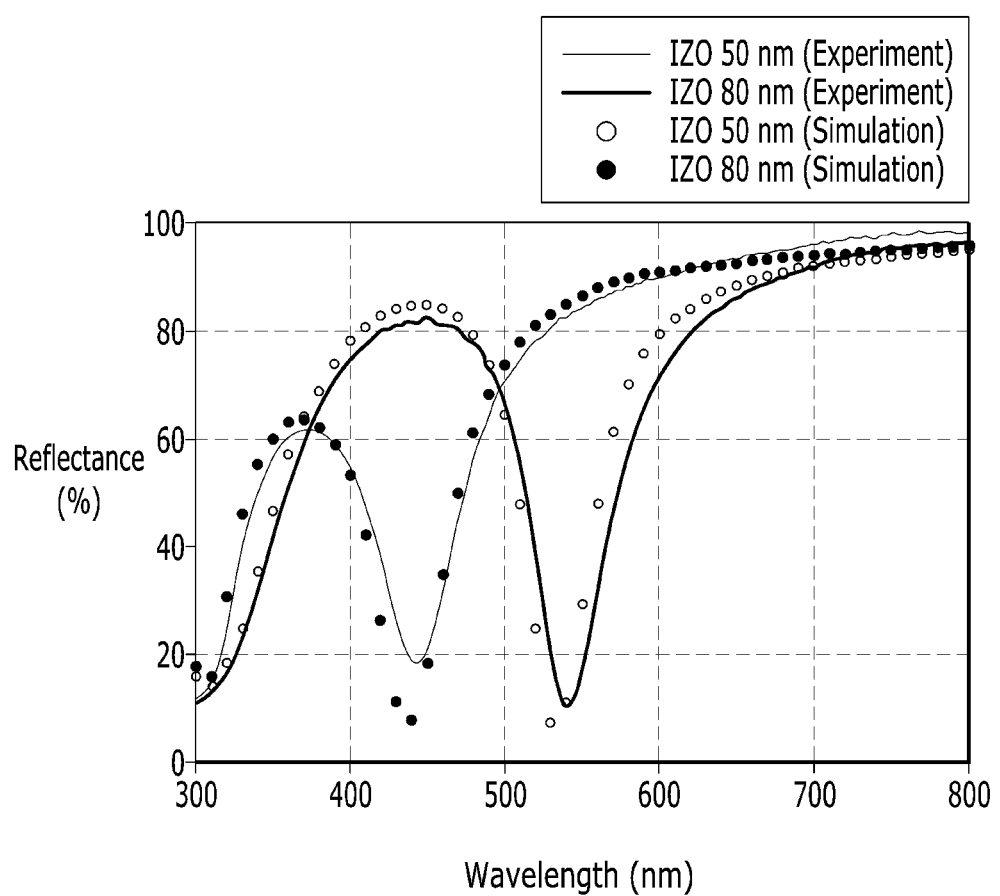
FIG. 4 to FIG. 11 are simulations of reflectance and transmittance of an optical fingerprint sensor according to an exemplary embodiment of the present invention and actual experiment data.

FIG. 4 is a graph of a reflectance simulation and a test result with application of an IZO transparent oxide layer with different thicknesses and a Ag metal layer.

Figure 5:
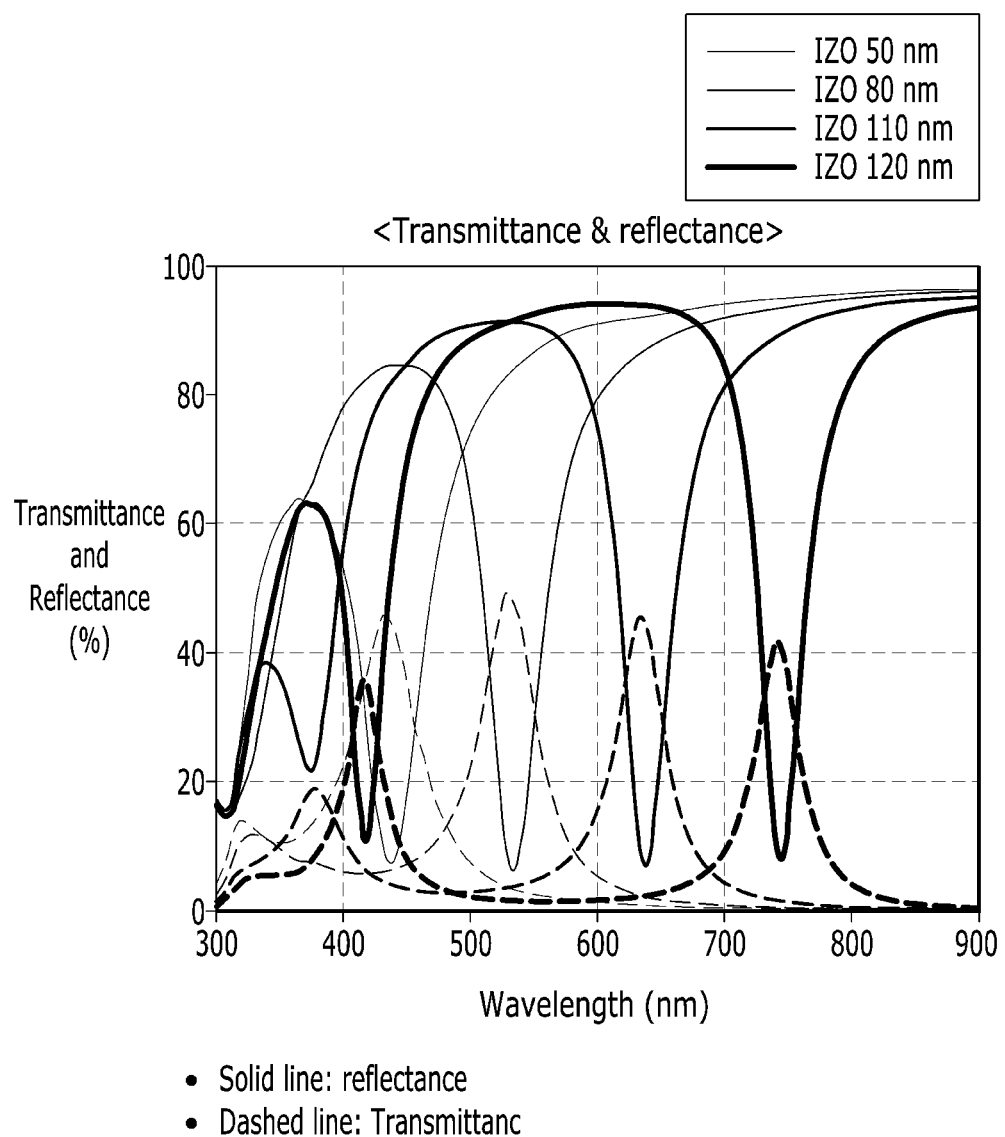

FIG. 5 is a graph of a reflectance and transmittance simulation with application of an IZO transparent oxide layer with different thicknesses and a Ag metal layer.

Figure 6:
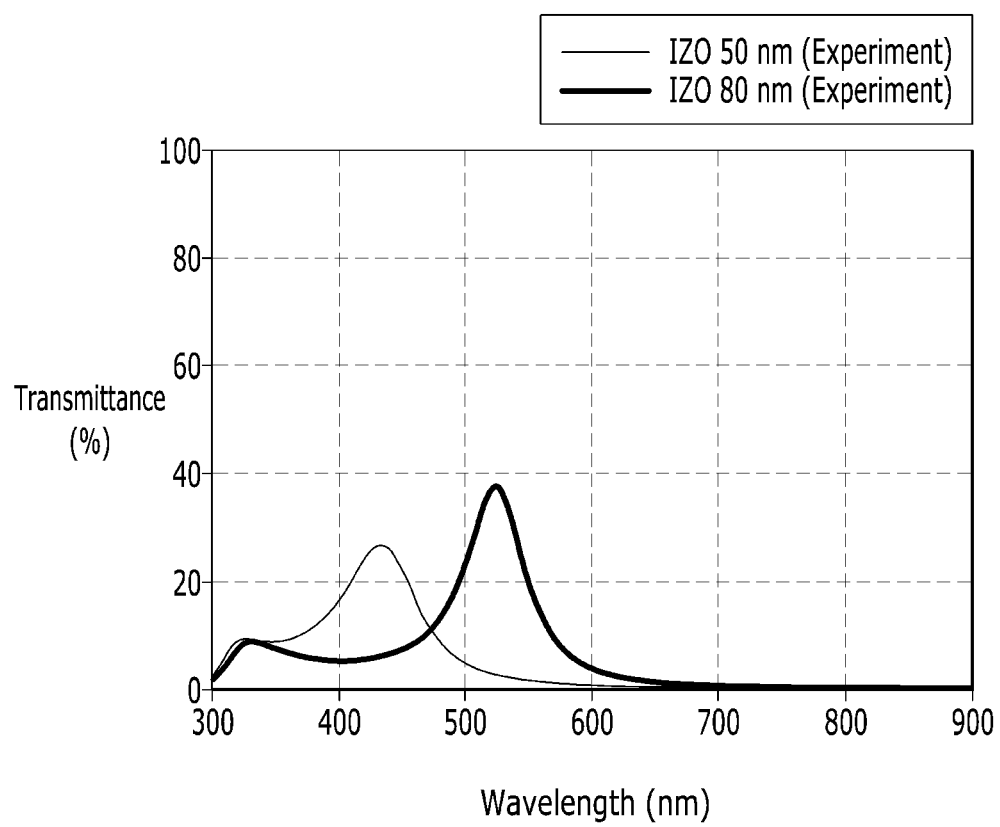

FIG. 6 is graph of a reflectance and transmittance experiment result with application of an IZO transparent oxide layer with different thicknesses and a Ag metal layer.

Figure 7:
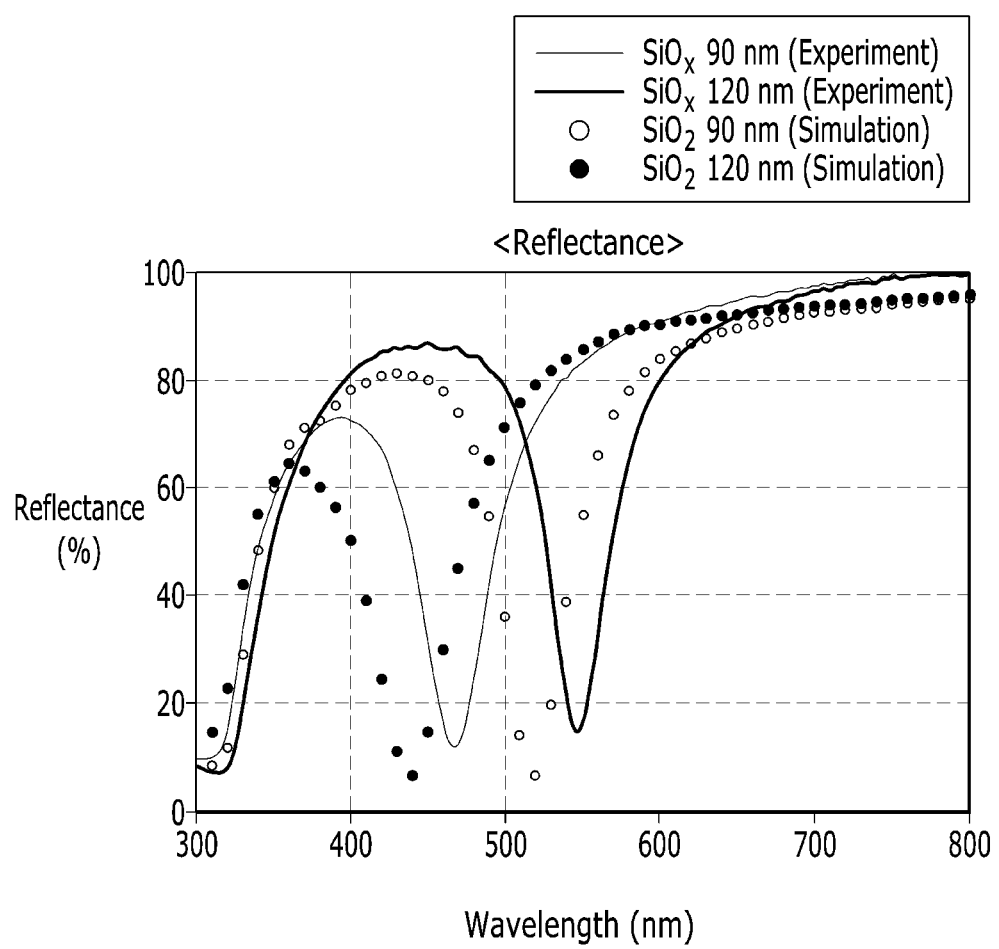

FIG. 7 is graph of a reflectance simulation and an experiment result with application of a $SiO_2$ transparent oxide layer with different thicknesses and a Ag metal layer.

Figure 8:
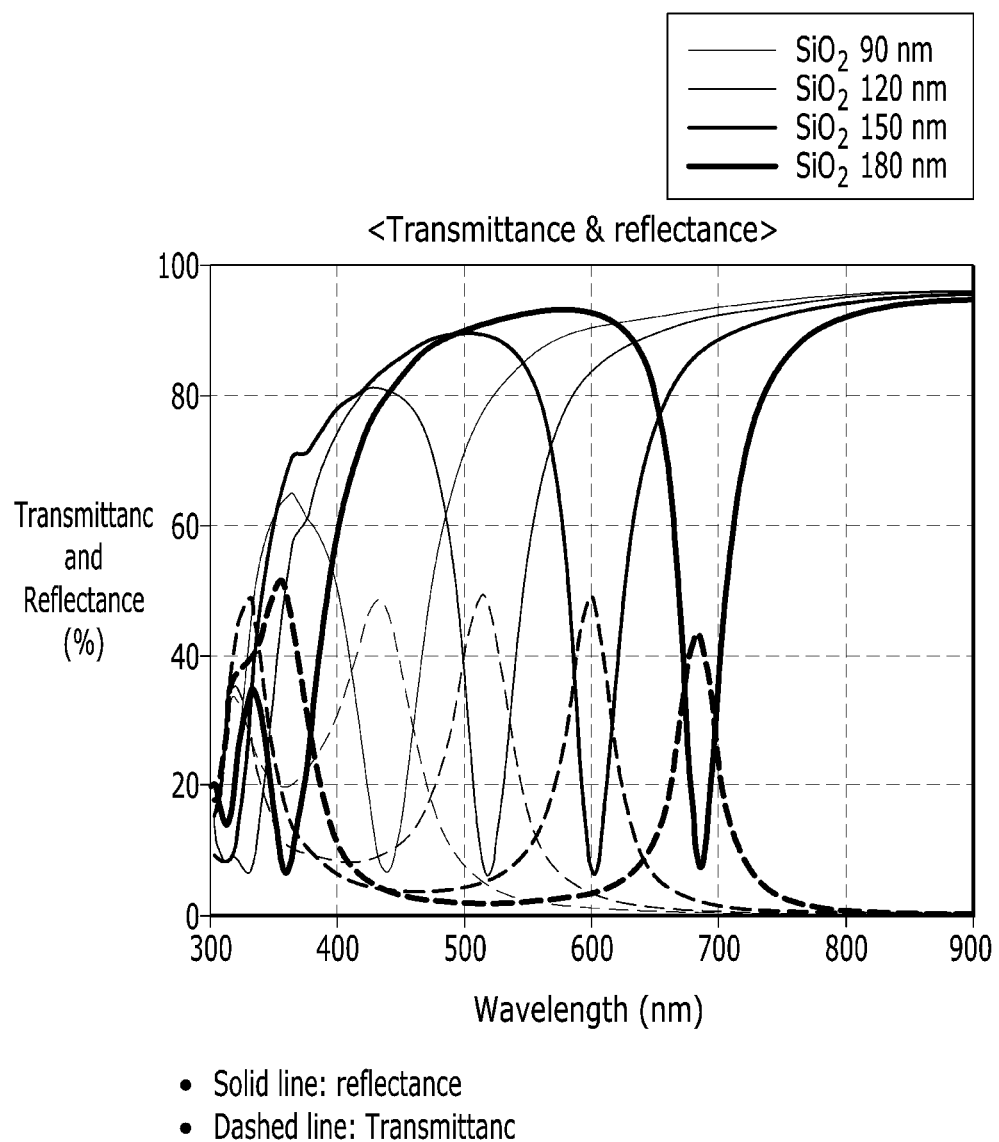

FIG. 8 is graph of a simulation of reflectance and transmittance with application of a $SiO_2$ transparent oxide layer with different thicknesses and a Ag metal layer.

Figure 9:
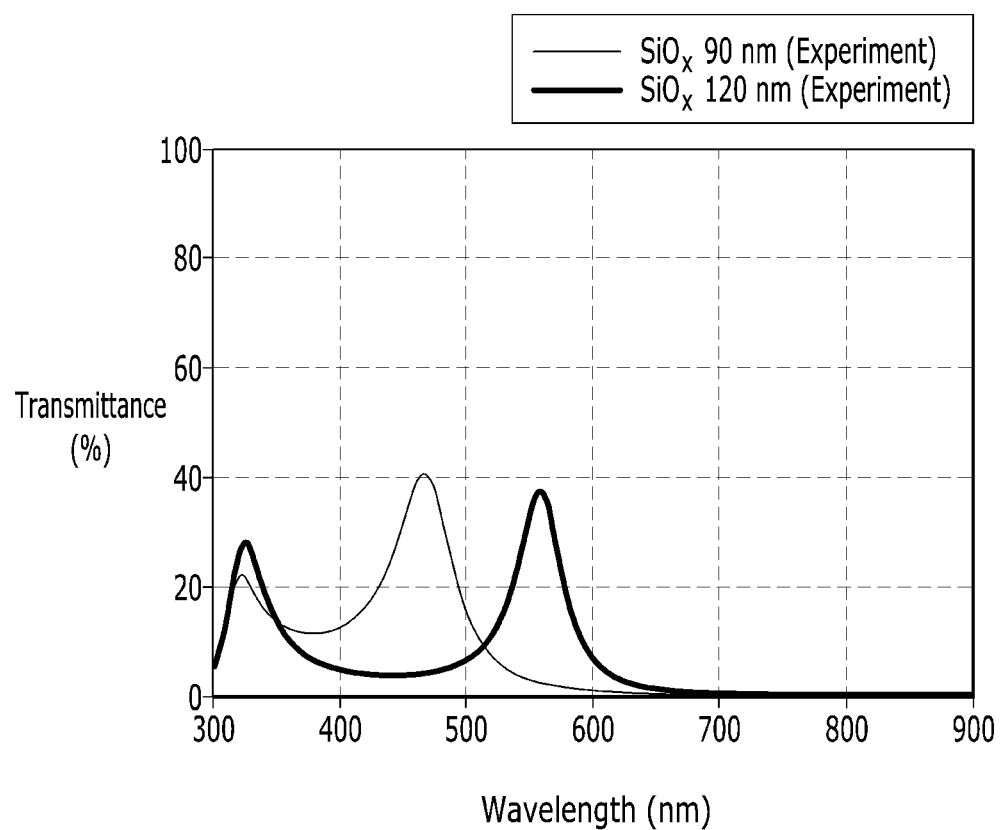

FIG. 9 is graph of an experiment result of reflectance and transmittance with application of a $SiO_2$ transparent oxide layer with different thicknesses and a Ag metal layer.

Figure 10:
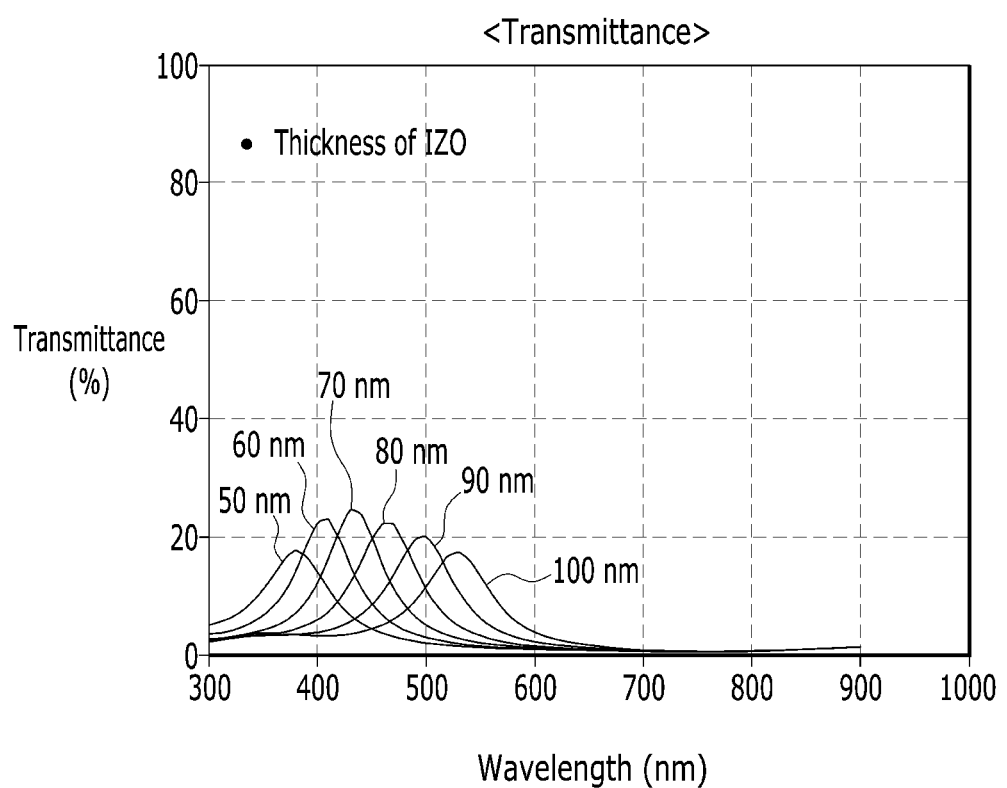

FIG. 10 is graph of a simulation of reflectance and transmittance with application of an IZO transparent oxide layer with different thicknesses and an Al metal layer.

Figure 11:
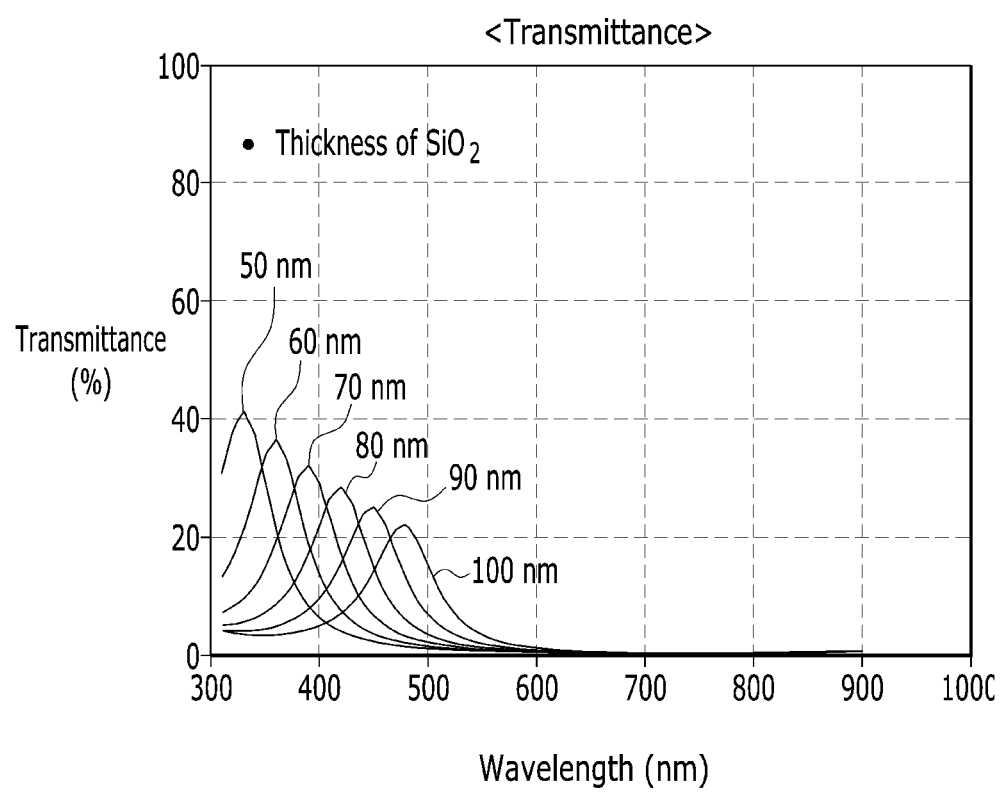

FIG. 11 is graph of a simulation of reflectance and transmittance with application of a $SiO_2$ transparent oxide layer with different thicknesses and an Al metal layer.

FIG. 4 to FIG. 6 are simulations and actual experiment results with respect to a structure in which a Ag metal layer, an IZO transparent oxide layer, and a Ag metal layer are sequentially stacked. Reflectance and transmittance were observed while forming the Ag layer as a 30 nm thin film layer and varying a thickness of the IZO transparent oxide layer.

FIG. 4 shows a simulation and an experiment of reflectance while varying a thickness of the IZO transparent oxide layer to 50 nm and 80 nm, and the figure shows that the simulation and the experiment results are almost equivalent to each other. When the IZO transparent oxide layer has a thickness of 50 nm, reflectance was about 60% in a second half of a wavelength region of 300 nm, reflectance was about 20% in a wavelength of 400 nm to 500 nm, and reflectance was about 90% in a wavelength region of 500 nm or more. When the IZO transparent oxide layer has a thickness of 80 nm, reflectance was about 80% in a wavelength region of 400 nm to 500 nm, reflectance was about 10% in a wavelength region of 500 nm to 600 nm, and reflectance was about 90% in a wavelength of 600 nm or more.

FIG. 5 shows a simulation result of transmittance and reflectance while varying a thickness of the IZO transparent oxide layer to 50 nm, 80 nm, 110 nm, and 120 nm. Reflectance was lowest and transmittance was highest in a wavelength region of 400 nm to 500 nm when the thickness of the IZO was 50 nm, in a wavelength region of 500 nm to 600 nm when the thickness of the IZO was 80 nm, in a wavelength region of 600 nm to 700 nm when the thickness of the IZO was 110 nm, and in a wavelength region of 700 nm to 800 nm when the thickness of the IZO was 120 nm.

FIG. 6 shows an experiment result of transmittance when the thickness of the IZO was 50 nm and 80 nm, wherein transmittance was about 30% in a wavelength region of 400 nm to 500 nm when the thickness of the IZO was 50 nm, and transmittance was about 40% in a wavelength region of 500 nm to 600 nm when the thickness of the IZO was 80 nm.

As shown in the simulation and experiment results of FIG. 4 to FIG. 6, light of a specific wavelength can be reflected with high reflectance depending on a thickness of the IZO, and the light of the specific wavelength can be transmitted with higher transmittance compared to reflectance. Accordingly, the graphs of FIG. 4 to FIG. 6 imply that light of a specific wavelength can be used with very high utilization efficiency depending on a structure and a thickness of the transparent oxide layers 300 and 310 and the metal layers 400 and 410, and such utilization efficiency implies that precise fingerprint recognition can be achieved with a small amount of light in the fingerprint sensor of the present invention. For example, when an LCD backlight is used as the light source, light of a mid-400 nm wavelength, included with the highest intensity in the LCD backlight, can be used with high light utilization efficiency when a thickness of the IZO transparent oxide layer is 40 nm to 60 nm and a thickness of the Ag metal layer is 20 nm to 40 nm. In addition, when an OLED light source is used, light of a low 500 nm wavelength, included with the highest intensity in the OLED light source, can be used with high light utilization efficiency when a thickness of the IZO transparent oxide layer is 70 nm to 90 nm and a thickness of the Ag metal layer is 20 nm to 40 nm. In terms of low cost and life-span of the light source, the LCD backlight is preferable.

FIG. 7 to FIG. 9 are simulations and actual experiment results of a structure in which a Ag metal layer, a $SiO_2$ transparent oxide layer, and a Ag metal layer are stacked. Reflectance and transmittance were observed while forming the Ag layer as a 30 nm thin film layer and varying a thickness of the $SiO_2$ transparent oxide layer.

The simulation and actual experiments were performed while adjusting the thickness of $SiO_2$. A result of the simulation and experiment shows that the minimum of reflectance or the maximum of transmittance in a wavelength of 420 nm to 460 nm when the thickness of $SiO_2$ was 90 nm, in a wavelength of 500 nm to 540 nm when the thickness of $SiO_2$ was 120 nm, in a wavelength of 580 nm to 620 nm when the thickness of $SiO_2$ was 150 nm, and in a wavelength of 660 nm to 700 nm when the thickness of $SiO_2$ was 180 nm. That is, when the LCD backlight is used as the light source, the light utilization efficiency becomes the highest when the thickness of $SiO_2$ is 80 nm to 110 nm and the thickness of the Ag metal layer is 20 nm to 40 nm.

FIG. 10 and FIG. 11 show test results when the Ag metal layer is replaced with an Al metal layer, wherein FIG. 10 shows a test result of the Al metal layer and the IZO transparent oxide layer and FIG. 11 shows a test result of the Al metal and the $SiO_2$ transparent oxide layer. Transmittance was the highest when the thickness of the IZO was 70 nm in FIG. 10, and transmittance was decreased when the thickness of the $SiO_2$ was decreased in FIG. 11. That is, the IZO transparent oxide layer is more effective in terms of light utilization efficiency when an Al metal layer having a thickness of 8 nm to 12 nm is used, and the light utilization efficiency becomes the highest when the thickness of the IZO is 60 nm to 80 nm.

In an embodiment of the present invention, a thin film transistor 500 may further be included in the protection layer 100, and the active layer 200 may be provided on an electrode that extends from a drain electrode of the thin film transistor 500. The thin film transistor 500 of the present exemplary embodiment of the present invention can sense contact of a fingerprint and switch a signal sensed by the active layer, and may include any one of a co-planar structure, a staggered structure, an inverted co-planar structure, and an inverted staggered structure.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

What is claimed is:

1. An optical fingerprint recognition sensor comprising:
a glass substrate;
a protection layer that is positioned on the glass substrate;
an active layer that is positioned above the glass substrate and in the protection layer; and
a functional layer that is positioned in the protection layer and on the active layer and that includes a first transparent oxide layer and a first metal layer that are sequentially stacked,
wherein the first metal layer is disposed as a top layer of the functional layer, which is closest from a top surface of the protection layer,
wherein a refractive index of the first metal layer is higher than a refractive index of the first transparent oxide layer and the refractive index of the first transparent oxide layer is higher than a refractive index of the active layer, and
wherein a part of a light which is reflected from a finger and transmitted through the first metal layer is reflected multiple times between the active layer and the first metal layer.

2. The optical fingerprint recognition sensor of claim 1, further comprising a second metal layer that is positioned between the active layer and the functional layer.

3. The optical fingerprint recognition sensor of claim 2, further comprising a second transparent oxide layer that is positioned between the active layer and the second metal layer.

4. The optical fingerprint recognition sensor of claim 3, wherein the second transparent oxide layer and the second metal layer are sequentially stacked.

5. The optical fingerprint recognition sensor of claim 3, wherein the second transparent oxide layer and the second metal layer are spaced apart from each other.

6. The optical fingerprint recognition sensor of claim 5, wherein the second metal layer is positioned under the functional layer and the second transparent oxide layer is positioned on the active layer.

7. The optical fingerprint recognition sensor of claim 5, wherein the protection layer comprises an interior protection layer that is positioned on the glass substrate and an exterior protection layer that is positioned on the interior protection layer, the active layer and the second transparent oxide layer are positioned in the interior protection layer, and the functional layer and the second metal layer are positioned in the exterior protection layer.

8. The optical fingerprint recognition sensor of claim 3, wherein the first transparent oxide layer and the second transparent oxide layer comprise a metal oxide.

9. The optical fingerprint recognition sensor of claim 3, wherein the first transparent oxide layer and the second transparent oxide layer comprise indium zinc oxide (IZO) or $SiO_2$.

10. The optical fingerprint recognition sensor of claim 2, wherein the first metal layer and the second metal layer comprise the same material.

11. The optical fingerprint recognition sensor of claim 2, wherein the first metal layer and the second metal layer comprise Ag or Al.

12. The optical fingerprint recognition sensor of claim 2, wherein the first metal layer and the second metal layer comprise Ag, and the first metal layer and the second metal layer have a thickness of 20 nm to 40 nm.

13. The optical fingerprint recognition sensor of claim 2, wherein the first transparent oxide layer comprises indium zinc oxide (IZO), a thickness of the first transparent oxide layer is 20 nm to 150 nm, the first metal layer and the second metal layer comprise Al, and the first metal layer and the second metal layer have a thickness of 8 nm to 12 nm.

14. The optical fingerprint recognition sensor of claim 1, wherein the first transparent oxide layer comprises indium zinc oxide (IZO), and a thickness of the first transparent oxide layer is 20 nm to 150 nm.

15. The optical fingerprint recognition sensor of claim 1, wherein the first transparent oxide layer comprises $SiO_2$, and a thickness of the first transparent oxide layer is 50 nm to 200 nm.

16. The optical fingerprint recognition sensor of claim 1, further comprising a thin film transistor that is positioned in the protection layer,
wherein the active layer is positioned on an electrode that extends from a drain electrode of the thin film transistor.

17. The optical fingerprint recognition sensor of claim 16, wherein the thin film transistor has a co-planar structure, a staggered structure, an inverted co-planar structure, or an inverted staggered structure.

18. The optical fingerprint recognition sensor of claim 1, further comprising a liquid crystal display (LCD) backlight that is positioned below the optical fingerprint sensor.

* * * * *